United States Patent [19]

Kado et al.

[11] 3,954,511

[45] May 4, 1976

[54] SURFACE TREATMENT OF A WEATHER-RESISTANT STEEL

[75] Inventors: Satoshi Kado, Fujisawa; Tsuneyasu Watanabe, Kamakura; Kazuhiro Masuda, Sagamihara, all of Japan

[73] Assignee: Nippon Steel Corporation, Tokyo, Japan

[22] Filed: Nov. 7, 1974

[21] Appl. No.: 521,875

[30] Foreign Application Priority Data
Nov. 12, 1973   Japan.............................. 48-126980

[52] U.S. Cl. ...................... 148/6.15 R; 148/6.15 Z; 148/6.16
[51] Int. Cl.² .......................................... C23F 7/10
[58] Field of Search ................. 148/6.15 Z, 6.15 R; 117/75 M; 148/6.16; 106/14

[56] References Cited
UNITED STATES PATENTS

| | | |
|---|---|---|
| 2,525,107 | 10/1950 | Whiting et al.............. 148/6.15 Z X |
| 3,479,229 | 11/1969 | Becker........................... 148/6.35 X |
| 3,615,893 | 10/1971 | Matsushima et al. .......... 148/6.15 Z |

*Primary Examiner*—Ralph S. Kendall
*Attorney, Agent, or Firm*—Toren, McGeady and Stanger

[57] ABSTRACT

Surface treatment of weather-resistant steel by applying a liquid composition comprising 5 to 50% of $Fe_3O_4$ + $Fe_2O_3$, 0.01 to 5% of phosphoric acid, 0.01 to 10% of at least one selected from the consisting of Pb, Ni, Cu, P, Zn, Cr and their compounds, 3 to 30% of butyral resin, the balance being solvent by spraying or brushing. The surface treatment is effective for preventing the occurence of the initial rust formation of the steel and promoting a stable and dense protective rust against subsequent corrosion of the steel.

4 Claims, No Drawings

SURFACE TREATMENT OF A WEATHER-RESISTANT STEEL

The present invention relates to surface treatment of steel, more particularly surface treatment for promoting formation of a protective film against corrosion on the surface of a weather-resistant steel.

A weather-resistant steel generally means a low alloy steel containing a small amount of alloying elements such as Cu, Cr, P and Ni as the case requires and having outstanding characteristics that when the steel is exposed to the outdoor atmosphere, it produces so-called red rust of yellowish brown (hereinafter called initial rust) during the first one or two years of the exposure, but subsequently the amount of the initial rust decreases gradually and the corrosion rate lowers and in the last the rust layer changes into a dense and stable protective film having corrosion resistance.

This stabilized rust layer is composed mainly of oxides of $Fe^{+++}$ and $Fe^{++}$ with a small amount of alloying elements such as Cu, Cr, Ni and P produced by corrosion (dissolution) of the weather-resistant steel itself, and shows very high stability in the atmospheric air.

For these characteristics, weather-resistant steels have been increasingly used without painting or lacquering in many buildings and structures in recent years. In these cases, however, there is often a problem that surroundings of the buildings and the structures such as of mortar, concrete, glass, wood and other metals are stained by the initial rust produced from the weather-resistant steel in the initial stage of its use as explained before.

Thus, the surface treatment of a weather-resistant steel which is applied for the purpose of preventing the above initial rust is important also from an aspect of assuring the profit from the characteristics of "maintenance-free" after the formation of stable rust.

For the formation of dense and stable rust on a weather-resistant steel, it has been almost impossible by a conventional art to obtain such stable rust before the initial period of initial rust formation.

More particularly, rust preventive paints or lacquers or metal platings are aimed to corrosion resistance of the coating flim itself, and if the film is once destroyed, the initial rust flows out from the steel surface therethrough. These means are effective only for delaying the rust formation. Therefore, retreatment or repair is required as the film gets old in these cases and there is no consideration for promoting formation of the stable rust of a weather-resistant steel.

On the other hand, in the field of the surface treatment of a weather-resistant steel, a phosphate treatment has been well known for its effectiveness for increasing the density of the stable rust, but this treatment is not satisfactory for preventing the rust formation in the initial stage.

Also a method has been known for forming an organic film after the phosphate treatment. This method, however, has been confronted with an economical disadvantage because it requires two steps of surface treatment and with an operational difficulty. Further, the technical thought of this method is completely different from that of the present invention.

Therefore, one of the object of the present invention is to provide a liquid composition for surface treatment of a weather-resistant steel effective for preventing the initial rust formation, shortening the period in which the stable rust is produced and assuring increased density of the stable rust.

The feature of the present invention lies in that the surface treatment is done in a single step by spraying or brushing a treating liquid composition on the weather-resistant steel.

The liquid for surface treatment according to the present invention has the following compositions:

1. A liquid composition for surface treatment of a weather-resistant steel which comprises 5 to 50% of $Fe_3O_4 + Fe_2O_3$, 0.01 to 5% of phosphoric acid, 0.01 to 10% of at least one selected from the consisting of Pb, Ni, Cu, P, Zn, Cr and their compounds, 3 to 30% of butyral (poly-vinyl butyral) resin, the balance being solvent.

2. A liquid composition in which the butyral resin is used together with a resin having compatibility therewith.

3. A liquid composition which further comprises 0.05 to 5% of at least one selected from the group consisting of primary phosphate of Al, Fe, Na, Zn and Mn.

Since the thickness of the film given by the treatment of the present invention is 5 to $30\mu$, thinner than that of the ordinary paint coating, this film does not have adverse effects on the weldability even when welding is done directly on the film.

According to the present invention, firstly, an artificial stable rust is formed by means of a mixture of $Fe_3O_4$ and $Fe_2O_3$ which are the main components of the stable rust produced from a weather-resistant steel itself with cooporation of the addition of elements or compounds such as Pb, Ni, Cu and Cr having weather-resistance. Then, the stable rust is hardened with a butyral resin, or a butyral resin in combination with a resin such as melamine and phenol resin compatible with the butyral resin so as to restrict the water permeation through the rust. Meanwhile, the small amount of water permeating the film causes rust formation to the weather-resistant steel, but the rust formation rate is slow enough to combine with the compounds contained in the film and a corrosion resistant oxide of at least one of Zn, P, Cr, Ni and Pb is produced so that the formation of stable rust is promoted thereby as well as by $Fe_3O_4$ and $Fe_2O_3$ in an earlier stage.

Thus, the initial rust formation is prevented and at the same time iron phosphate is produced by $H_3PO_4$ contained in the film so that adhesion of the artificial stable rust as well as its rust preventiveness are improved, and the particles of stable rust subsequently produced are made fine. In this way a completely stable rust can be formed.

According to the present invention, one or more of primary salt phosphoric acid of Fe, Na, Zn, Mn and Al may be added to the treating liquid because they are very hard to oxidize and contribute for formation of a stable rust having the adhesion and rust preventiveness of an artificial stable rust.

In the present invention, the amount of $Fe_3O_4$ and $Fe_2O_3$ mixture in the treating liquid is defined to 5 to 50%. Less than 5%, the artificial stable rust is not produced due to too small amount of iron in the film, thus allowing flow-out of the initial rust. On the other hand, if the amount exceeds 50%, the film is brittle and suffers from damages, giving only unsatisfactory practical usefulness.

According to an actual measurement, when the mixture of $Fe_3O_4$ and $Fe_2O_3$ is less than 5%, the initial rust during 28 day outdoor exposure gets about five times of that formed by the liquid composition within the present invention.

Further, in the present invention, 0.01% to 5% of phosphoric acid is added to the treating liquid for the reason that less than 0.01% phosphoric acid gives no effect, but on the other hand, more than 5% phosphoric acid makes the film wet and sticky and it is impossible to dry the film at ordinary temperatures.

Further, the reason for limiting the content of one or more of Pb, Ni, Cu, P, Zn and Cr and their compounds to 0.01 to 10% is based on the following experiments.

| Amount of one or more or Pb, Ni, Cu, P, Zn and Cr (weight %) | Results of Exposure Test | Color of Rust | Density of Rust (A:very dense, B : dense) |
|---|---|---|---|
| 0.005 | Stable rust in 30 months | Brown rust | B |
| 0.01 | Stable rust in 18 months | Dark brown rust | A |
| 0.1 | Stable rust in 15 months | " | A |
| 1.0 | Stable rust in 12 months | " | A |
| 10.0 | Stable rust in 10 months | " | A |
| 13.0 | Stable rust in 10 months | " | A |
| 0 | Stable rust in 36 months | Brown rust | B |

As clear from the above experiment results, better results can be obtained when the amount of one or more of Pb, Ni, Cu, P, Zn and Cr is within the above range.

According to a modification of the present invention, 0.05 to 5% of one or more of primary phosphate of Fe, Na, Zn, Mn, Al etc. is added for the reason that when less than 0.05% is added, it takes 28 months before a stable rust is formed according to an actual measurement, even when more than 5% is added, only similar results can be obtained as when 5% is added.

Further, reasons for limiting the resin for hardening the artificial stable rust to butyral resins and resins having compatibility with butyral resins are that these resins are easily mixed with the other components of the treating liquid and simplify the spraying or brushing of the treating liquid on the steel surface, and further shorten the drying time and that they assure good adhesion of the treating liquid to an outer coating when the treating liquid is applied as a base coating.

The addition of these resins is limited to 3 to 30% for the reason that the addition less than 3% renders the film brittle and very susceptible to damages, and on the other hand, the addition more than 30% increases viscosity of the treating liquid and lowers operation efficiency, and requires a considerable time for drying the film.

Further, the thickness of the film is limited to 5 t0 30$\mu$ in the present invention for the following reasons.

Generally, in case of a thick film of more than 30$\mu$ as a rust preventing paint coating, it is impossible to avoid occurrence of blow holes during the welding of the coated sheet, but in case of a thin film as in the present invention, it is possible to prevent the occurrence of blow holes. When the film is thinner than 5$\mu$, however, the steel surface can not be coated completely and such a thin film is not enough for forming a uniform and stable rust.

The present invention will be more clearly understood from the following example.

1. Chemical Composition of Weather-Resistant Steel

| | | |
|---|---|---|
| C : 0.09% | Si : 0.42% | Mn : 0.38% |
| P : 0.101% | S : 0.012% | Cu : 0.29% |
| Cr: 0.61% | Ni : 0.18% | |

2. Composition of Surface Treating Liquid

| | | |
|---|---|---|
| a | Denatured Alcohol | 55 % |
| | Butyral Resin | 10 % |
| | Copper Oxide | 2 % |
| | Phosphoric Acid | 2 % |
| | Chromic Acid Anhydride | 1 % |
| | Lead Chromate | 2 % |
| | Water | 2 % |
| | Zinc (Powder) | 0.5 % |
| | Iron Oxides (mixture of $Fe_3O_4$ and $Fe_2O_3$) | 10 % |
| | Butanol | Balance |
| b | Denatured Alcohol | 65 % |
| | Butyral Resin | 12 % |
| | Iron Oxides (mixture of $Fe_3O_4$ and $Fe_2O_3$) | 7 % |
| | Phosphoric Acid | 1.5% |
| | Primary Aluminum Phosphate | 0.1% |
| | Primary iron Phosphate | 0.1 % |
| | Zinc Chromate | 1.5 % |
| | Copper (Powder) | 0.5 % |
| | Butanol | Balance |
| c | Denatured Alcohol | 60 % |
| | Butyral Resin | 9 % |
| | Phenol Resin | 2 % |
| | Iron Oxides (mixture of $Fe_3O_4$ and $Fe_2O_3$) | 22 % |
| | Phosphoric Acid | 1 % |
| | Primary Zinc Phosphate | 0.1% |
| | Lead Chromate | 2 % |
| | Butanol | Balance |
| d | Denatured Alcohol | 50 % |
| | Butyral Resin | 10 % |
| | Melamine Resin | 2 % |
| | Iron Oxides (mixture of $Fe_3O_4$ and $Fe_2O_3$) | 15 % |
| | Phosphoric Acid | 1 % |
| | Chromic Acid Anhydride | 1 % |
| | Chromium (Powder) | 0.1% |
| | Lead Deoxide | 0.5% |
| | Nickel (Powder) | 0.02% |
| | Butanol | Balance |
| e | Denatured Alcohol | 50 % |
| | Toluene | 10 |
| | Butyral Resin | 5 % |
| | Nitrocellulose | 1 % |
| | Iron Oxides (mixture of $Fe_3O_4$ and $Fe_2O_3$) | 35 % |
| | Phosphoric Acid | 0.02% |
| | Chromic Acid | 1 % |
| | Lead Phosphate | 1 % |
| | Copper (Powder) | 0.05% |
| | Butanol | Balance |

Five sheets of weather-resistant steel defined in (1) having 3.2mm thickness, 300mm length and 300mm width were prepared, and subjected to shot blasting to remove completely mill scale from the surface, and then coated with the treating liquids a, b, c, d and e of (2) by air sprying to form a film of 30$\mu$ thickness on the surface of the weather-resistant steel sheets.

These five sample steel sheets thus coated were exposed to the atmospheric air in an industrial district together with non-treated weather-resistant steel sheets as comparison. The amounts of flow-out of the initial rust during 80 days after the starting of exposure were measured, and it was revealed that the amounts of iron flowing in the weather-resistant steel sheets treated with the liquids of a to e according to the present invention were within a range from 14 to 25 mg Fe/l while the amount in the non-treated weather-resistant steel sheet was 240 mg Fe/l.

By applying the treatment according to the present invention, it was possible to reduce the amount of the initial rust to less than 1/10 of that encountered in case of non-treated weather-resistant steels.

The sample sheets were successively exposed and after 0.5 year of the exposure about 2% of dark brown iron oxide (stable rust) was formed in the examples $a$ to $e$ and the area proportion occupied by the stable rust increased gradually and a completely stable rust was formed in about 10 months in these examples while no stable rust was yet formed in the non-treated sheet.

The stable rust thus formed was more dense that the rust of the non-treated sheet, and no initial rust was formed any more and corrosion made almost no progress.

What is claimed is:

1. A liquid composition for surface treatment of a weather-resistant steel which comprises 5 to 50% of $Fe_3O_4 + Fe_2O_3$, 0.01 to 5% of phosphoric acid, 0.01 to 10% of at least one selected from the consisting of Pb, Ni, Cu, P, Zn, Cr and their compounds, 3 to 30% of butyral resin, the balance being solvent.

2. A liquid composition according to claim 1, which further comprises 0.05 to 5% of at least one selected from the group consisting of primary phosphate Al, Fe, Na, Zn and Mn.

3. A method for surface treatment of a weather-resistant steel which comprises applying the treating liquid composition according to claim 1 on the surface of the steel and, drying the coating to obtain 5 to 30$\mu$ film thickness.

4. A liquid composition according to claim 1, wherein the butyral resin is used together with a resin having compatibility therewith selected from the group consisting of melamine resin, phenol resin and nitrocellulose.

* * * * *